No. 861,093. PATENTED JULY 23, 1907.
H. G. CORDLEY.
WATER COOLER STAND.
APPLICATION FILED DEC. 19, 1906.
2 SHEETS—SHEET 1.
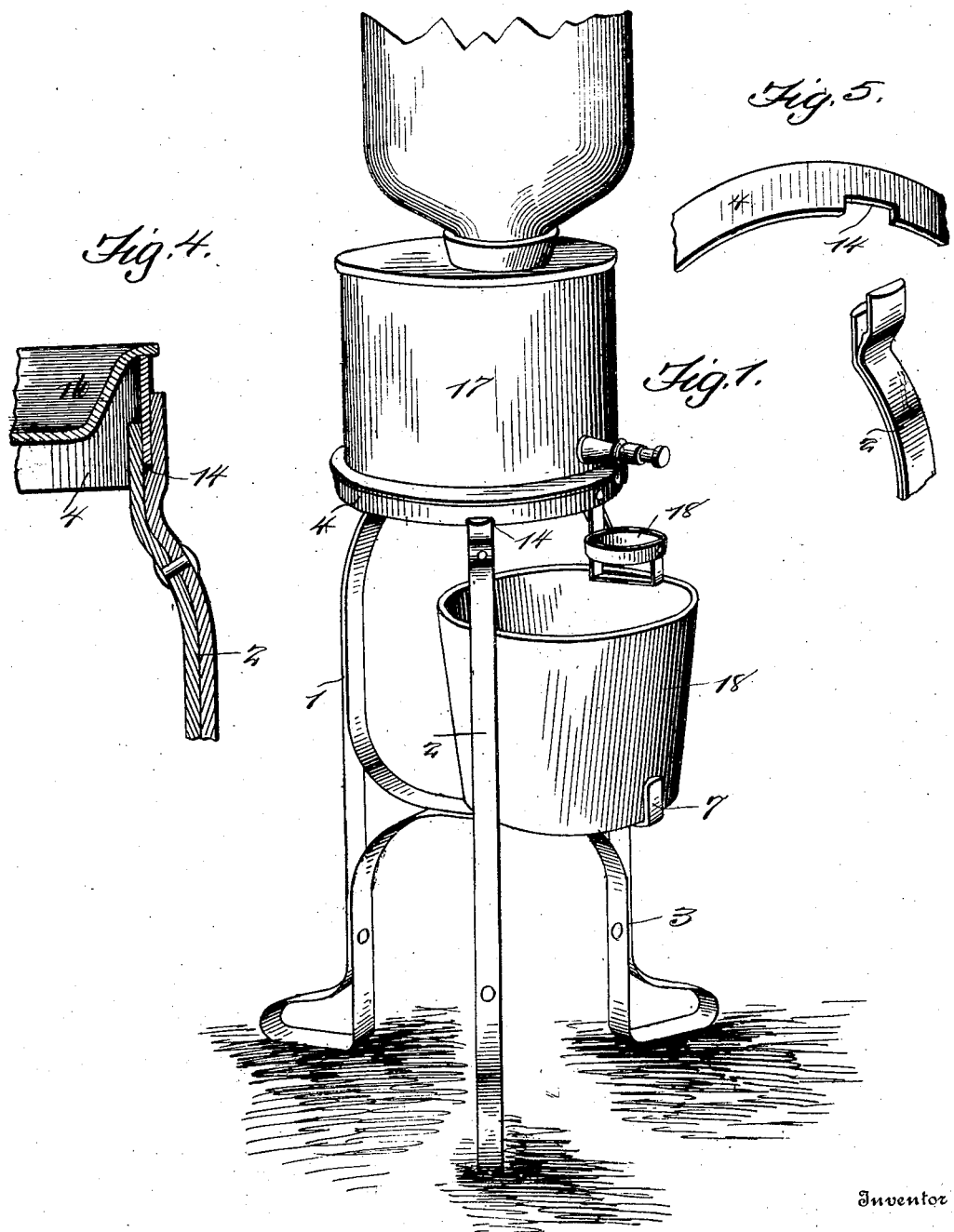
Witnesses
Inventor
Henry G. Cordley
By
Attorney
THE NORRIS PETERS CO., WASHINGTON, D. C.

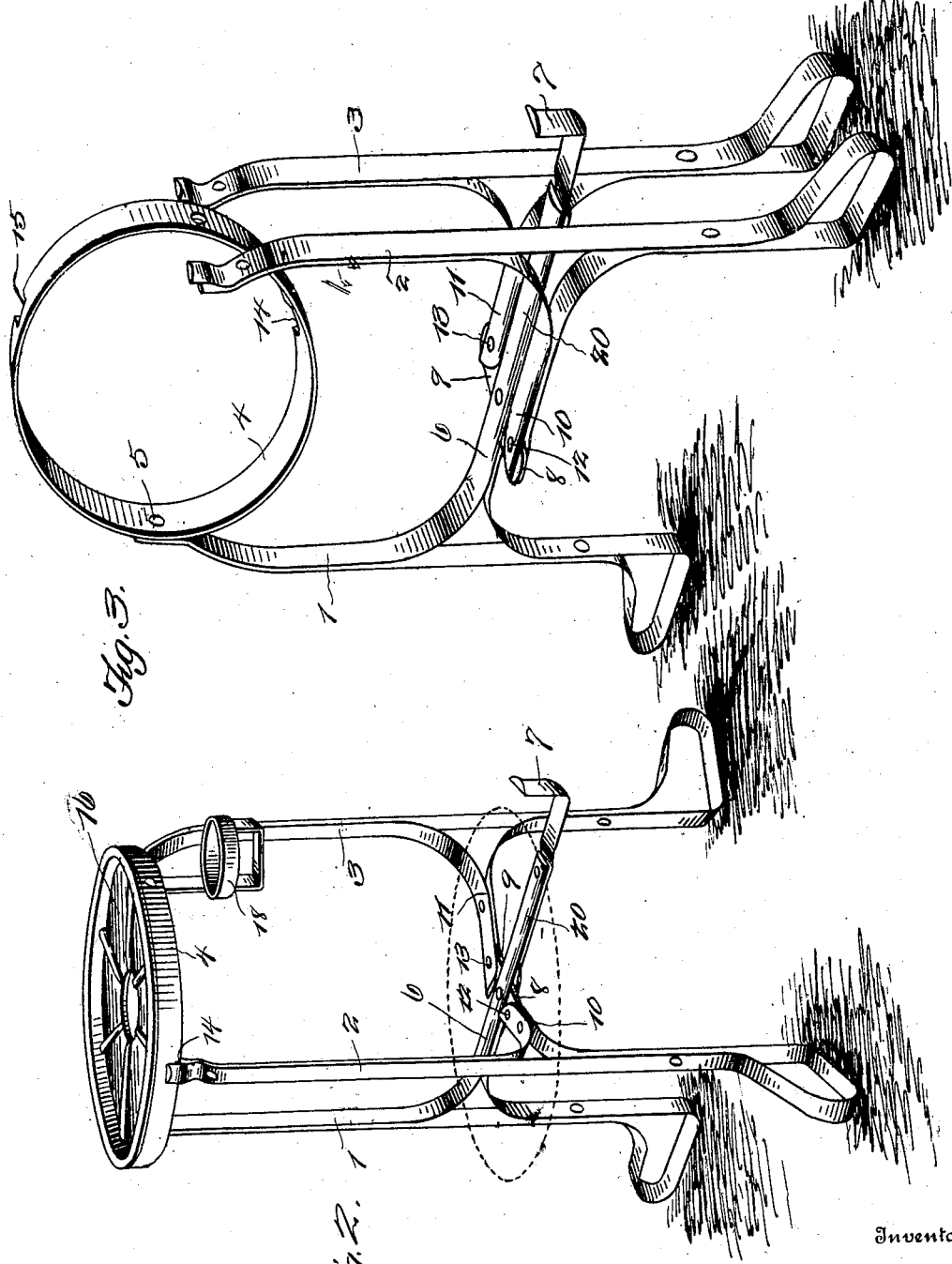

UNITED STATES PATENT OFFICE.

HENRY GREELEY CORDLEY, OF GLENRIDGE, NEW JERSEY.

WATER-COOLER STAND.

No. 861,093.  Specification of Letters Patent.  Patented July 23, 1907.

Application filed December 19, 1906. Serial No. 348,631.

*To all whom it may concern:*

Be it known that I, HENRY GREELEY CORDLEY, a citizen of the United States, residing at Glenridge, in the county of Essex, State of New Jersey, have invented certain new and useful Improvements in Water-Cooler Stands, of which the following is a description, reference being had to the accompanying drawings, forming a part hereof.

My invention relates to a collapsible stand for supporting water coolers and accessories thereof, and it consists in a stand which may be folded up so as to occupy the least possible space when boxed or crated for shipment; which stand may, however, be readily unfolded and set up for use; and when properly adjusted the various elements thereof will be locked in position thereby forming a strong and rigid stand especially adapted for the purpose specified.

In the accompanying drawings: Figure 1 is a perspective view showing my stand in use with a water cooler supported thereon and a pail supported by the stand for receiving waste water. Fig. 2 is a similar view showing the stand extended but without the cooler and pail. Fig. 3 is a perspective view of the stand when collapsed or folded. Figs. 4 and 5 are fragmentary views illustrating the connection between a leg and the supporting ring, whereby the ring is supported and the leg locked in position.

In the drawings, 1, 2 and 3 are three supporting legs shown herein as formed of bar iron bent into proper form and riveted, whereby a strong and light construction is secured.

4 is a supporting hoop or ring fixedly secured to one of the legs as 1, by a suitable pivotal connection or equivalent fastening device at 5, the connection being such that the hoop may be turned to bring it into a horizontal position when the stand is extended or unfolded.

The leg 1 is provided with an inwardly extending portion 6, which portion is prolonged or continued as shown at 20 across the space beneath the supporting hoop and to a point beyond the circumference of a circle circumscribing the legs as shown in Fig. 2, where it is provided with an upwardly extending portion 7. The extension 6 is provided with lugs 8 and 9 located centrally of the stand; and the legs 2 and 3 are provided with inwardly projecting portions 10 and 11 which are pivotally connected with the lugs 8 and 9 as shown at 12 and 13.

The upper ends of the legs 2 and 3 and the hoop 4 are so formed that the parts will interlock to form a rigid connection when the stand is unfolded and set up for use, but which may be readily disconnected to permit the stand to be folded. This is accomplished, in the stand shown, by providing the hoop 4 with two notches as shown at 14 and 15 of a length equal to the width of the upper ends of the legs 2 and 3, and by forming the upper ends of said legs bifurcated, as shown in Figs. 4 and 5; whereby the upper ends of the legs will enter the notches, and a portion of the legs lie upon either side of the hoop, as will be evident from said figures, thereby producing a secure and interlocking connection when the stand is unfolded and set up for use.

16 is a circular tray supported by the hoop 4, and 17 is a water cooler resting upon said tray.

18 is a support for a drinking glass supported by the hoop 4.

The inwardly projecting portions 6, 10 and 11, of the legs, and the forward extension 20 of the part 6 form a convenient support for the pail 18 adapted to receive waste water, the extension 20 of the portion 6 coöperating with the portions 10 and 11 to support the pail in such a way that a portion thereof extends without the supporting stand and beneath the glass support, whereby drip from the faucet of the cooler will fall into the pail. The upward extension 7 keeps the pail from slipping from its support.

Having thus described my invention and explained the operation thereof, I claim and desire to secure by Letters Patent:

1. In a collapsible water cooler stand, three supporting legs each having a rigid extending portion intermediate its ends, the arrangement of the legs being such that said extending portions converge toward a common center when the stand is unfolded; pivotal connections for securing the inner ends of said extensions together and for permitting said legs to be folded into positions parallel with each other; a supporting ring secured to one of said legs and capable of movement to bring it into a position parallel with the legs when folded; and means whereby the two other legs engage and support said ring when the stand is unfolded and set up for use.

2. In a collapsible water cooler stand, a plurality of legs each having an extending portion intermediate its ends and formed integrally therewith, the arrangement of the legs being such that said extending portions converge toward a common center when the stand is unfolded; pivotal connections for securing the inner ends of said extensions together and for permitting said legs to be folded into positions parallel with each other; one of said extending portions being prolonged; a supporting ring pivotally secured to one of said legs and capable of rotation about its pivot to bring it into a position parallel with the legs when folded; and means whereby said ring and the other legs are interlocked when the stand is unfolded and set up for use.

3. In a collapsible water cooler stand, a plurality of legs each having an extending portion intermediate its ends and formed integrally therewith, the arrangement of the legs being such that said extending portions converge toward a common center when the stand is unfolded; pivotal connections for securing the inner ends of said extensions together and for permitting said legs to be folded into positions parallel with each other; a supporting ring pivotally secured to one of said legs and capable of rotation about its pivot to bring it into a position parallel with the legs when folded; the extending portion of the leg supporting said ring being continued to a point beyond the circumference of a circle circumscribing the legs and upturned at its end; and means whereby said ring and the other legs are interlocked when the stand is unfolded and set up for use.

4. In a collapsible water cooler stand, a plurality of legs each having an extending portion intermediate its ends and formed integrally therewith, the arrangement of the legs being such that said extending portions converge toward a common center when the stand is unfolded; pivotal connections for securing the inner ends of said extensions together and for permitting said legs to be folded into positions parallel with each other; a supporting ring pivotally secured to one of said legs and capable of rotation about its pivot to bring it into a position parallel with the legs when folded; and notches formed in said ring with which the upper ends of the other legs engage, thereby forming an interlocking connection between said legs and ring when the stand is unfolded and set up for use.

5. In a collapsible water cooler stand, a plurality of legs each having an extending portion intermediate its ends and formed integrally therewith, the arrangement of the legs being such that said extending portions converge toward a common center when the stand is unfolded; pivotal connections for securing the inner ends of said extensions together and for permitting said legs to be folded into positions parallel with each other; a supporting ring pivotally secured to one of said legs and capable of rotation about its pivot to bring it into a position parallel with the legs when folded; the upper ends of the other legs being bifurcated and adapted to receive the said ring; and notches formed in the lower edge of said ring and adapted to receive the bifurcated ends of the legs, whereby an interlocking connection is formed between the ring and legs when the stand is unfolded and set up for use.

6. In a collapsible water cooler stand, a plurality of legs each having an extending portion intermediate its ends and formed integrally therewith, the arrangement of the legs being such that said extending portions converge toward a common center when the stand is unfolded; pivotal connections for securing the inner ends of said extensions together and for permitting said legs to be folded into positions parallel with each other; a supporting ring pivotally secured to one of said legs and capable of movement about its pivot to bring it into a position parallel with the legs when folded; and means whereby said ring and the other legs are interlocked when the stand is unfolded and set up for use.

7. In a collapsible water cooler stand, three supporting legs each having a rigid extending portion intermediate its ends, the arrangement of the legs being such that said extending portions converge towards a common center when the stand is unfolded and set up for use; a supporting ring pivotally secured to one of said legs and capable of rotation about its pivot; lugs carried by the extending portion of the leg which supports said ring; pivotal connections for securing the inner ends of the extending portions of the two other legs to said lugs; and means whereby said ring and said last mentioned legs are interlocked when the stand is unfolded and set up for use.

8. In a collapsible water cooler stand, three supporting legs each having a rigid extending portion intermediate its ends, the arrangement of the legs being such that said extending portions converge toward a common center when the stand is unfolded and set up for use; a supporting ring pivotally secured to one of said legs and capable of rotation about its pivot; lugs carried by the extending portion of the leg which supports said ring, and said extending portion being continued to a point beyond the circumference of a circle circumscribing the legs and upturned at its end; pivotal connections for securing the inner ends of the extending portions of the two other legs to said lugs; and means whereby said ring and said last mentioned legs are interlocked when the stand is unfolded and set up for use.

This specification signed and witnessed this tenth day of December, A. D. 1906.

HENRY GREELEY CORDLEY.

In the presence of—
JOHN STEINHAUSER,
GEORGE A. BATE.